US008365066B2

(12) United States Patent
Williamson (10) Patent No.: US 8,365,066 B2
(45) Date of Patent: Jan. 29, 2013

(54) SYSTEMS AND METHODS FOR PROCESSING MARKUP LANGUAGE SPECIFIED SPREADSHEET STYLES

(75) Inventor: Chris Williamson, Boulder, CO (US)

(73) Assignee: Konica Minolta Laboratory U.S.A., Inc., San Mateo, CA (US)

(*) Notice: Subject to any disclaimer, the term of this patent is extended or adjusted under 35 U.S.C. 154(b) by 124 days.

(21) Appl. No.: 12/703,179

(22) Filed: Feb. 9, 2010

(65) Prior Publication Data
US 2011/0197118 A1 Aug. 11, 2011

(51) Int. Cl.
*G06F 17/00* (2006.01)
(52) U.S. Cl. .......................... 715/217; 715/234
(58) Field of Classification Search .................. 715/212, 715/217, 234; 717/152
See application file for complete search history.

(56) References Cited

U.S. PATENT DOCUMENTS

| | | | |
|---|---|---|---|
| 6,613,098 B1 | 9/2003 | Sorge et al. | |
| 7,313,758 B2* | 12/2007 | Kozlov | 715/234 |
| 2006/0136433 A1* | 6/2006 | Rothschiller et al. | 707/100 |
| 2006/0146349 A1 | 7/2006 | Romney | |
| 2006/0224607 A1 | 10/2006 | Tchaitchian et al. | |
| 2007/0022128 A1* | 1/2007 | Rothschiller et al. | 707/100 |
| 2008/0062192 A1 | 3/2008 | Voliter et al. | |
| 2008/0300850 A1* | 12/2008 | Chen et al. | 703/22 |
| 2009/0254808 A1* | 10/2009 | Yuan et al. | 715/234 |
| 2010/0091322 A1* | 4/2010 | Kim | 358/1.15 |
| 2011/0197117 A1 | 8/2011 | Williamson | |
| 2011/0205259 A1 | 8/2011 | Hagood, IV | |

OTHER PUBLICATIONS

Veldema, Ronald et al. "Object Combining: A new aggressive optimization for Object Intensive Programs". Nov. 3, 2002, Association for Computing Machinery.*

Wimmer, Christian et al. "Automatic Feedback-Directed Object Inlining in the Java HotSpot Virtual Machine". Jun. 13, 2007, Association for Computing Machinery.*
ECMA-376-1, Information technology—Document description and processing languages—Office Open XML File Formats Part 1: Fundamentals and Markup Language Reference, Second Edition (2008).
Office Open XML, Ecma TC45, Final Draft, Part 1: Fundamentals, Oct. 2006.
Office Open XML, Part 3: Primer, Dec. 2006.
ECMA International Technical Committee TC45: Office Open XML—ECMA TC45 Final Draft—Part 3: Primer, ECMA International, Oct. 6, 2006, retrieved from the Internet: http://www.ecma-international.org/news/TC45_current_work/Office%20Open%20XML%20Part%203%20-%20Primer.pdf, downloaded Mar. 6, 2012, section 3.7.

(Continued)

*Primary Examiner* — Cesar B. Paula
*Assistant Examiner* — Tyler J Schallhorn
(74) *Attorney, Agent, or Firm* — Finnegan, Henderson, Farabow, Garrett & Dunner, L.L.P.

(57) ABSTRACT

Methods to facilitate the processing of formatting information for cells in a spreadsheet document described in a markup language are presented. For spreadsheet documents that include a plurality of style objects, cell formatting information may be obtained from a master style object that stores master formatting information. In addition, named style information may be obtained from a style name object that stores named styles. Further, cell specific formatting information, which can override master formatting information, may be obtained from a cell-specific style object that includes cell specific formatting information. Combined cell formatting information for cells may be stored in a cell format object, wherein the combined cell formatting information can comprise named styles, cell-specific formatting information that overrides formatting information in the master style object, and master formatting information that has not been overridden by the cell-specific formatting information.

20 Claims, 5 Drawing Sheets

OTHER PUBLICATIONS

Korsgard, D. S., et al., "Dynamic Styling in Web Development," Aalborg University, Jun. 12, 2009; retrieved from the Internet: URL:http://projekter.aau.dk/projekter/files/17697778/final.pdf, downloaded Mar. 7, 2012.

European Search Report and Written Opinion dated Mar. 26, 2012 for European Application No. EP 11153546.4 (EP 2,354,964).

Office Action dated Feb. 16, 2012, in related application U.S. Appl. No. 12/703,173, filed Feb. 9, 2010.

\* cited by examiner

SYSTEMS AND METHODS FOR PROCESSING MARKUP LANGUAGE SPECIFIED SPREADSHEET STYLES

BACKGROUND

1. Technical Field

The present disclosure pertains to the field of printing and in particular, to systems and methods for the processing style data for spreadsheets described using markup languages.

2. Description of Related Art

Document processing software allows users to view, edit, process, store, and print various types of documents conveniently. Document content for printing can be described using a variety of ways, including through the use of markup languages such as Office Open eXtensible Markup Language ("OOXML"), or SpreadsheetML ("SML") which is based on XML and is typically used with spreadsheets. Markup languages permit the textual annotation of a document. Descriptive markup languages can be used to specify structural relationships between parts of the document but typically do not provide any instructions on how the document is to be rendered or presented to end users. On the other hand, procedural and presentational markup languages may include instructions that detail how the document content is to be rendered.

When a document described using a descriptive markup language is rendered, the structural relationships between document parts can complicate the process of determining the final renderable content for printing. In the case of documents such as spreadsheets, where the values of a spreadsheet cell may depend on a multiplicity of other cells, the complexity can be increased manifold. Spreadsheet elements such as cells, tables and their associated attributes are often represented programmatically as objects. Therefore, when spreadsheets specified in a markup language (such as OOXML) are processed for printing, a multiplicity of spreadsheet objects may be loaded into memory and pointers to one or more objects (which reflect structural relationships between document parts) may be traversed multiple times in order to determine the appearance of rendered objects. For example, for SML and various other OOXML descriptions, all data is typically loaded into memory before pagination determinations are made and rendering can start.

The loading of multiple objects into memory and the repeated pointer traversals during processing can contribute to the use of additional memory resources and other processing inefficiencies. For example, the use of additional memory can increase the cost of printers, while repeated pointer traversals during processing can contribute to lower throughput. In the context of spreadsheets, the processing of style-data associated with spreadsheet objects, such as spreadsheet cells and tables, can contribute significantly to memory resource use and processing inefficiencies. Thus, there is a need for systems and methods that permit the efficient processing and printing of style data associated with spreadsheet objects while using memory resources in a more optimal manner.

SUMMARY

Consistent with disclosed embodiments, systems and methods for processing markup language specified spreadsheet styles are presented. In some embodiments, a method for storing formatting information for at least one cell in a spreadsheet document described in a markup language, wherein the spreadsheet document includes a plurality of style objects, comprises: obtaining cell formatting information for the at least one cell from a master style object that stores master formatting information for the at least one cell; obtaining named style information for the at least one cell from a style name object that stores named styles for the at least one cell and references the cell style-master object; obtaining cell specific formatting information for the at least one cell from a cell-specific style object that includes cell specific formatting information for the at least one cell and references the master style object, wherein the cell specific formatting information overrides master formatting information; and storing combined cell formatting information for the at least one cell in a cell format object, wherein the combined cell formatting information in the cell format object comprises named styles for the at least one cell, cell-specific formatting information that overrides formatting information in the master style object, and master formatting information that has not been overridden by the cell-specific formatting information.

Embodiments disclosed also relate to methods created, stored, accessed, or modified by processors using computer-readable media or computer-readable memory.

These and other embodiments are further explained below with respect to the following figures.

DETAILED DESCRIPTION

In accordance with embodiments reflecting various features of disclosed embodiments, systems and methods for processing style data for spreadsheets described using markup languages are presented. In some embodiments, printable spreadsheet data may take the form of a markup language description. For instance, examples related to the processing of spreadsheets markup language data are described in terms of OOXML or SML. However, the systems and methods described may be applied to spreadsheets described using other markup languages with appropriate modifications as would be apparent to one of ordinary skill in the art.

Figure 1:
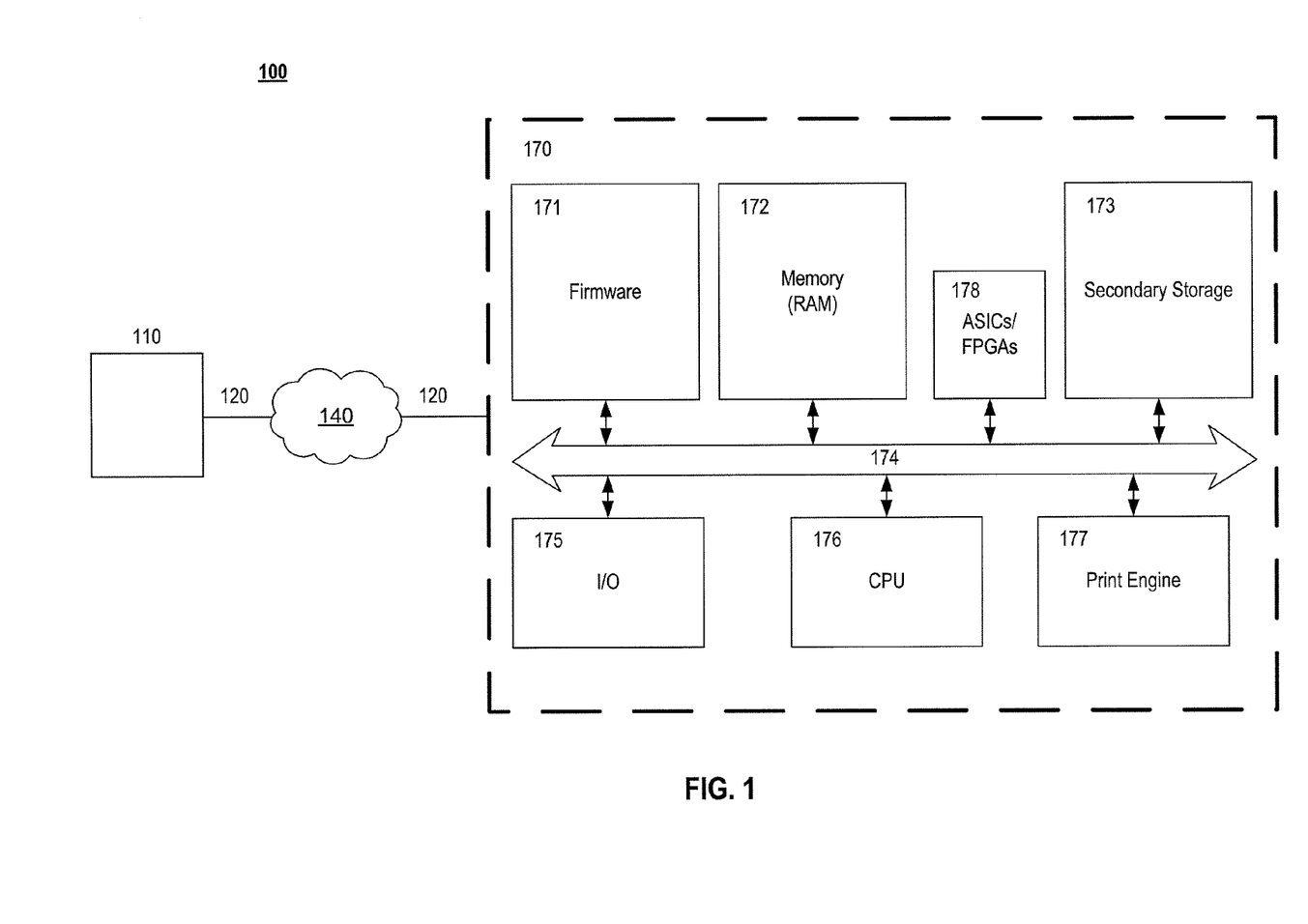
FIG. 1 shows a high-level block diagram of an exemplary computer coupled to an exemplary printer capable of executing an application for processing spreadsheet style data described using markup languages.

FIG. 1 shows a high-level block diagram of an exemplary computer coupled to an exemplary printer capable of executing an application for processing spreadsheet style data described using markup languages. In general, a computer software application consistent with disclosed embodiments may be deployed on a network of computers, printers, and other peripheral devices that are connected through communication links that allow information to be exchanged using conventional communication protocols and/or data port interfaces.

As shown in FIG. 1, exemplary system 100 includes computing device 110, which communicates with printer 170 over network 140 using connections 120. Computing device 110 may be a computer workstation, desktop computer, laptop computer, or any other computing device capable of being used in a networked environment. Computing device 110 may be capable of executing software (not shown) that allows the printing of documents, including documents such as spreadsheets or worksheets described using markup languages such as OOXML using printers 170.

Exemplary printer 170 includes devices that produce physical documents from electronic data including, but not limited to, laser printers, ink-jet printers, LED printers. Exemplary printer 170 may take the form of a plotter, facsimile machine, multi-function device, digital copier, etc. In some embodiments, printer 170 may also be capable of directly printing documents received from computing device 110. In some embodiments, such an arrangement may allow for the direct printing of documents, with (or without) additional processing by computing device 110.

In some embodiments, documents may be described using a markup language such as OOXML and may contain one or more of text, graphics, and images. In some embodiments, the documents may take the form of a spreadsheet described using OOXML or SML. In some embodiments, printer 170 may receive the OOXML or SML descriptions of documents for printing. Note, too, that document print processing can be distributed. Thus, computing device 110 and/or printer 170 may perform portions of document print processing such as markup language parsing, pre-processing, typesetting, rasterization, half-toning, color matching, and/or other manipulation processes before a document is physically printed by printer 170.

Computing device 110 may also contain removable media drives (not shown), which may include, for example, 3.5 inch floppy drives, CD-ROM drives, DVD ROM drives, CD±RW or DVD±RW drives, USB flash drives, and/or any other removable media drives consistent with disclosed embodiments. In some embodiments, portions of a software application for processing style data for spreadsheets may reside on removable media and be read and executed by computing device 110 using the removable media drive.

Connection 120 couples computing device 110 and printer 170 over network 140 and may be implemented as a wired or wireless connection using conventional communication protocols and/or data port interfaces. In general, connections 120 can be any communication channel that allows transmission of data between the devices. In one embodiment, for example, the devices may be provided with conventional data ports, such as parallel ports, serial ports, Ethernet, USB, SCSI, FIREWIRE, and/or coaxial cable ports for transmission of data through the appropriate connection. The communication links could be wireless links or wired links or any combination consistent with disclosed embodiments that allows communication between the various devices.

Network 140 could include a Local Area Network (LAN), a Wide Area Network (WAN), or the Internet. Printer 170 may be connected to network 140 through connection 120. In some embodiments, printer 170 may also be connected directly to computing device 110. System 100 may also include other peripheral devices (not shown), according to some embodiments. A computer software application for processing style data for spreadsheets consistent with the disclosed embodiments may be deployed on computer 110 and/or printer 170. For example, computing device 110 could execute some portions of software for the processing of style data for spreadsheets, while other portions may be executed by printer 170 in accordance with disclosed embodiments.

In some embodiments, printer 170 may contain bus 174 that couples CPU 176, firmware 171, memory 172, input-output ports 175, print engine 177, and secondary storage device 173. Printer 170 may also contain other Application Specific Integrated Circuits (ASICs), and/or Field Programmable Gate Arrays (FPGAs) 178 that are capable of executing portions of an application to render printable spreadsheet data specified in a markup language in a manner consistent with disclosed embodiments. In some embodiments, printer 170 may also be able to access secondary storage or other memory in computing device 110 using I/O ports 175 and connection 120. In some embodiments, printer 170 may also be capable of executing software including a printer operating system, markup language parsing software, rasterization routines, and other appropriate application software.

In some embodiments, CPU 176 may be a general-purpose processor, a special purpose processor, or an embedded processor. CPU 176 can exchange data including control information and instructions with memory 172 and/or firmware 171. Memory 172 may be any type of Dynamic Random Access Memory ("DRAM") such as, but not limited to, SDRAM, or RDRAM. Firmware 171 may hold instructions and data including but not limited to a boot-up sequence and pre-defined routines for markup language parsing, language processing, rasterization, and half-toning, as well as other code. In some embodiments, code and data in firmware 171 may be copied to memory 172 prior to being acted upon by CPU 176.

Routines in firmware 171 may include code to process and print documents such as spreadsheets described using markup languages such as OOXML or SML, which may be received from computing device 110. In some embodiments, such processing may include the processing of style-data for spreadsheets. Firmware 171 may also include compression routines and memory management routines. In some embodiments, data and instructions in firmware 171 may be upgradeable.

In some embodiments, CPU 176 may act upon instructions and data and provide control and data to ASICs/FPGAs 178 and print engine 177 to generate printed documents. FPGAs/ASICs 178 may also implement one or more of translation, compression, and rasterization algorithms.

In one embodiment, computing device 110 may send printable data in a document, such as a spreadsheet specified using a markup language to printer 170. Then, printer 170 may invoke routines to parse the markup language description and process style-data. For example, style data objects may be identified and processed in a manner consistent with described implementations.

In some embodiments, the translation process from a markup language description of a document to the final printable data may include the generation of intermediate printable data. In some embodiments, the intermediate printable data may comprise a display list, which may aid in the generation final printable data. In some embodiments, display lists may be stored in memory 172 or secondary storage 173. Exemplary secondary storage 173 may be an internal or external hard disk, memory stick, or any other memory storage device capable of being used in printer 170. In some embodiments, the display list may reside on one or more of printer 170 and/or computing device 110.

Figure 2:
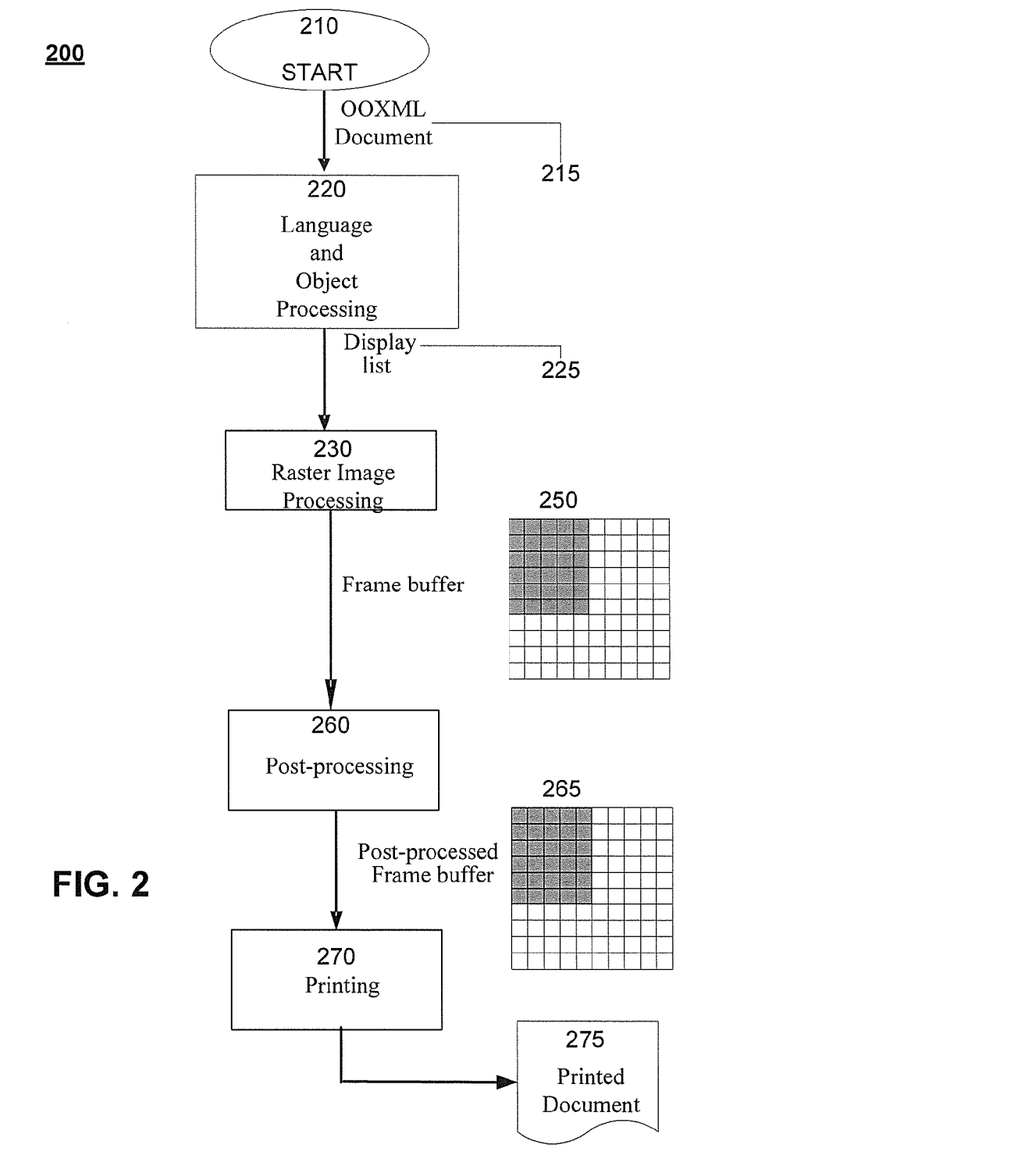
FIG. 2 shows exemplary process flow illustrating steps in a method for executing portions of an application to render printable data specified in a markup language.

FIG. 2 shows exemplary process flow 200 illustrating steps in a method for executing portions of an application to render printable data specified in a markup language. The process may start in step 210 with the initiation of a print job, which, in some instances, may be a spreadsheet specified in a markup language such as OOXML or SML.

In step 220, the document 215 can also be subjected to language and object processing. For example, data in the document may be parsed by an OOXML parser to identify individual objects, which may include style objects in a spreadsheet document, as well as text, image, and graphics objects. In some embodiments, language processing and object pre-processing may be performed by a markup language parser such as an OOXML parser and other associated routines. For spreadsheets, parsing may also be used to identify and process various objects specific to the spreadsheet such as cells, tables, shapes, and style objects. The parser may also process spreadsheet style data objects associated with spreadsheet cells and tables to permit efficient printing in a manner consistent with embodiments described herein.

Some of these operations may result in the placement of primitives that describe entries in display list 225. Exemplary display list 225 may be an intermediate step in the processing of data prior to actual printing and may be parsed further before conversion into a subsequent form. Display list 225 may include such information as color, opacity, boundary information, and depth.

The conversion process from a display list representation to a form suitable for printing on physical media may be referred to as rasterizing the data or rasterization. In some embodiments, rasterization may be performed by a Raster Image Processor in step 230. For example, basic rasterization may be accomplished by taking a three dimensional scene, typically described using polygons, and rendering the three dimensional scene onto a two dimensional surface. Polygons can be represented as collections of triangles. A triangle may be represented by three vertices in the three dimensional space. A vertex defines a point, an endpoint of an edge, or a corner of a polygon where two edges meet. Thus, basic rasterization may transform a stream of vertices into corresponding two dimensional points and fill in the transformed two dimensional triangles. Upon rasterization, the rasterized data may be stored in a frame buffer, such as exemplary frame buffer 250, which may be physically located in memory 172.

In step 230, Raster Image Processing (RIP) module may process objects in display list 225 and generate a rasterized equivalent in frame buffer 250. In some embodiments, raster image processing may be performed by printer 170. For example, raster image processing may be performed by printer 170 using one or more of CPU 176, ASICs/FPGAs 178, memory 172, and/or secondary storage 173. Raster image processing may be performed by printer 170 using some combination of software, firmware, and/or specialized hardware such as ASICs/FPGAs 178. Frame buffer 250 may hold a representation of print objects in a form suitable for printing on a print medium by print engine 177.

In some embodiments, data in frame buffer 250 may be subjected to post-processing in step 260. For example, various operations such as half-toning, trapping, etc may be carried out on the data in frame buffer 250. As a consequence of these operations, the data in frame buffer is altered resulting in post-processed frame buffer 265. Post-processed frame buffer 265 may then be subjected to any additional processing in step 270. For example, print engine 177, may process the rasterized post-processed data in post processed frame buffer 265, and form a printable image of the page on a print medium, such as paper.

Figure 3:
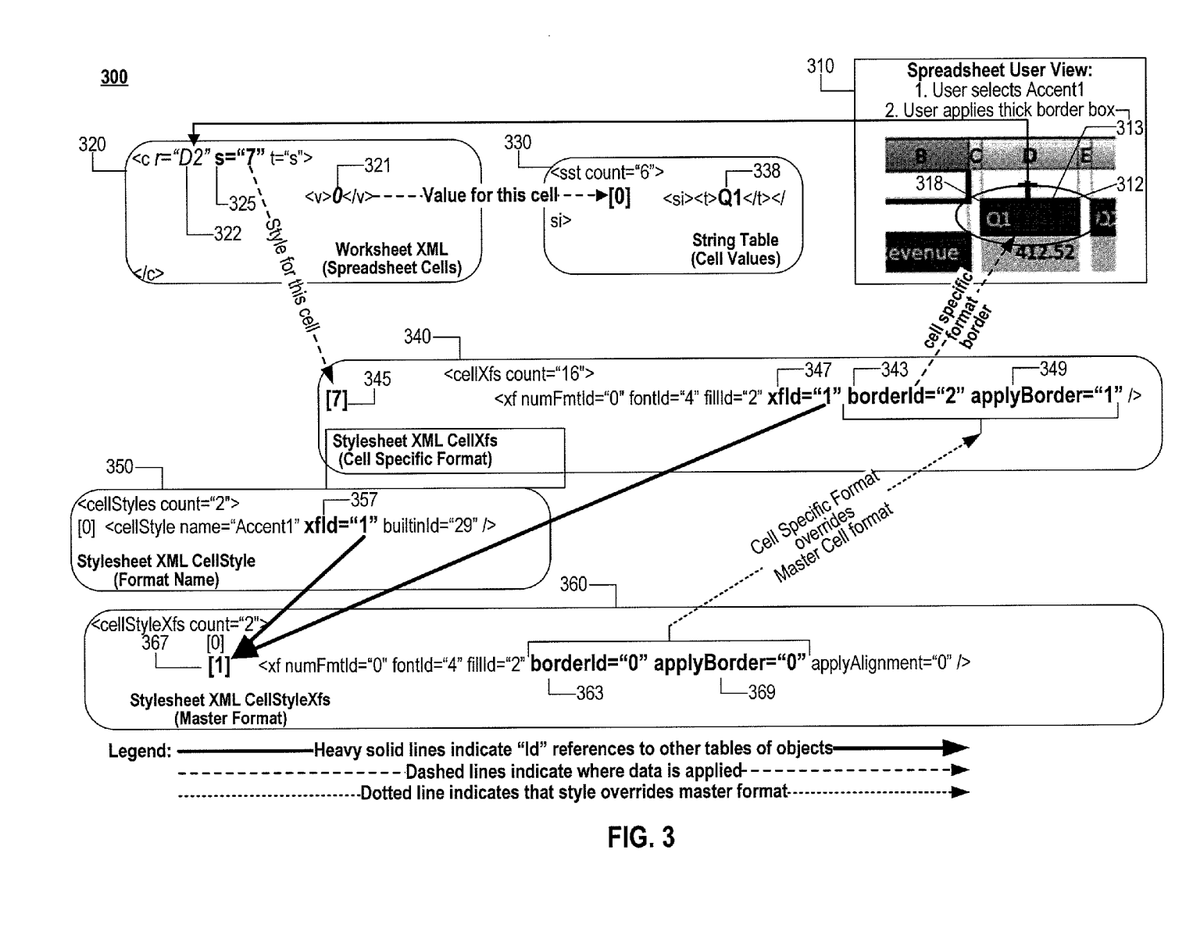
FIG. 3 shows a conventional exemplary OOXML cell-format specification for a spreadsheet cell.

FIG. 3 shows a conventional exemplary OOXML cell format specification 300 for a spreadsheet cell. As shown in FIG. 3, exemplary spreadsheet 310 includes cell 312 identified by its location "D2" (column D row 2 of spreadsheet), with spreadsheet cell data 318 given by the string "Q1". A cell can be specified by its location at the intersection of a row and column. Cells may hold data and have a number of characteristics, such as numeric or text formatting, alignment, font, color, fill, and border. As shown in FIG. 3, spreadsheet cell 312 has a named style "Accent1" and a thick border box 313, which has been applied by the user.

Cell 312 itself may be expressed by the "c" collection in Worksheet XML description 320, which indicates that the cell reference 322 is "D2". Exemplary cell 312 can also indicate style identifier 325 (attribute "s") with value s="7" and a data type (attribute t), which indicates that cell 312 holds data of "string" type indicated by t="s". To determine whether cell value attribute <v> 321 is a number or an index to a string, the cell's data type can be examined. When the cell data type indicates string, then it is an index and not a numeric value. As shown in FIG. 3, cell value index 321 is an index into zero-based index shared string table 330 and indicates the location of the contents of cell 312. Cell value index 321 has the value "0" indicating that it is the first entry in the shared string table 330, which maps to cell data 338 shown as "Q1".

Styles may be applied to objects in a spreadsheet. Cells, Tables, Cell ranges, PivotTables, Charts, and Shapes may be formatted using Styles, Themes, and Direct Formatting. A Style may be viewed as a named collection of formatting elements. For example, a cell style can specify number format, cell alignment, font information, cell border specifications, colors, and background/foreground fills. Table styles may specify formatting elements for the regions of a table, such as for the header row. A Style may specify color, font, and shape effects directly, or these elements can be referenced indirectly by referring to a Theme definition. Styles permit more consistently stylized documents. Themes define a set of colors, font information, and effects on shapes. If a style or formatting element defines its color, font, or effect by referencing a theme, then picking a new theme can cause the switching of all colors, fonts, and effects for that formatting element. When Direct Formatting is applied, individual formatting elements (e.g. a bold font face) have been used so that the formatting elements have been chosen individually instead of collectively by choosing a named Style.

As shown in FIG. 3, the cell 312 in spreadsheet 310 uses named style 325 referenced in Worksheet XML 320. The attribute value of named style 325 s="7" referenced in Worksheet XML 320 indicates that the eighth (or zero-based $7^{th}$) <xf> definition 345 of CellXfs or Cell Specific Format 340 holds the direct cell specific formatting information for cell 312 as shown by the dashed line from named style 325 to the eighth <xf> definition 345 in CellXfs. The cell style record (<xf>) ties together all the cell-specific formatting (e.g. number format, font information, borders, and fill) for a cell's direct formatting. CellXfs or Cell Specific Format 340 specifies the direct formatting elements for cell 312. For example, the attribute value for xfld 347 is 1, which implies that the second <xf> definition 367 in CellStyleXfs 360 holds the formatting information as indicated by the heavy solid line from xfld 347 to <xf> definition 367. Further, CellXfs 340 also shows that attribute value borderId 343 is 2 and that the border is to be applied as indicated by the "1" for attribute value applyBorder 349.

CellStyleXfs or Cell Master Format 360 can represent the master cell style for a named cell style. The master cell style <xf> record 367 representing the second definition in CellStyleXfs 360 ties together all the master formatting (e.g. number format, font information, and fill) for named cell style. As shown in FIG. 3 by the heavy solid line, <xf> 367 inside CellStyleXfs 360 is also referenced by zero-based index xfld 357 from a CellStyles 350 definition, which holds information pertaining to named cell styles. The master cell style record 367 also shows that attribute value borderId 363 is 0 and that no border is to be applied as indicated by the "0" for attribute value applyBorder 369. Note that although master cell style record 367 indicates borderId 363 as 0 and that no border is applied, these settings are overridden by cell specific formatting information in CellXfs or Cell Specific Format 340, which indicates that a thick border (borderId 343="2") is applied (applyBorder 349="1").

CellStyles 350 is a collection of named cell styles used in the workbook. As shown in FIG. 3, the user has selected named style "Accent 1" in spreadsheet 310 to be applied to cell 312. The named style "Accent 1" appears in CellStyles 350 and references zero-based index xfld 357 corresponding to the second definition in CellStyleXfs 360.

Figure 4:
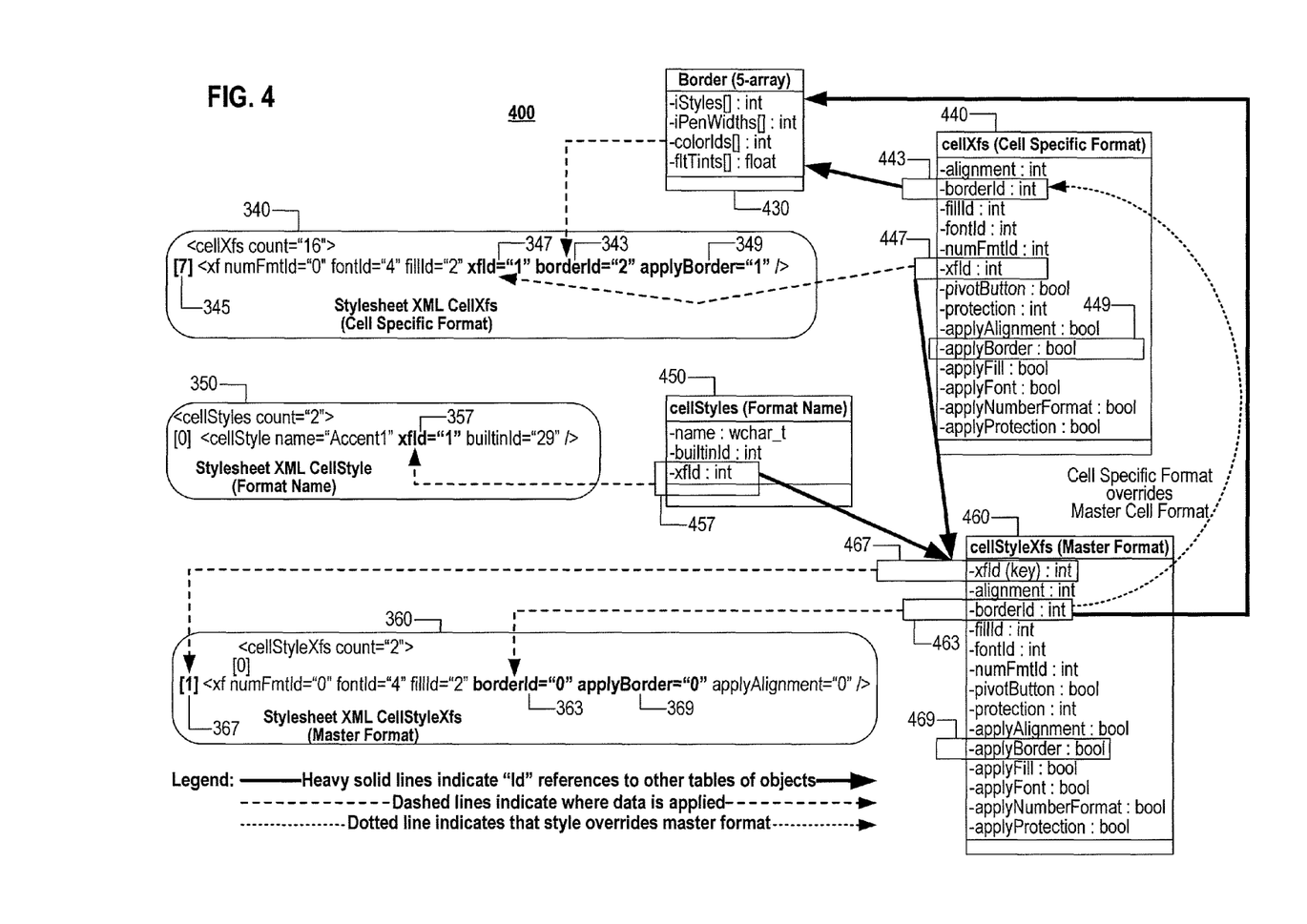
FIG. 4 shows a conventional exemplary object mapping for the exemplary OOXML spreadsheet cell-format specification shown in FIG. 3.

FIG. 4 shows a conventional exemplary object mapping 400 for the exemplary OOXML spreadsheet cell format specification shown in FIG. 3. As shown in FIG. 4, cellStyles object 450 identifies the named Style applied by the user ("Accent1") and holds a value for xfld 457 in cellStyles object 450. cellStyles object 450 holds information pertaining to named cell styles and can refer to objects holding master cell formatting information. Accordingly, in cellStyles definition 350, which corresponds to cellStyles object 450, the named style is indicated as "Accent1" and xfld 357 has the value 1 corresponding to the second definition in cellStyleXfs as shown by the dashed line. The value of attribute xfld 457 indicates the (zero-based) record number in cellStyleXfs object 460 that holds cell master format information as indicated by the heavy solid line from xfld 457 to xfld 467.

Similarly, cellStyleXfs object 460 holds master cell style information including values for cell master format attributes. In particular, the second definition of cellStyleXfs object 460 holds values for the master format of cell 312 (in FIG. 3). Accordingly, in cellStyleXfs definition 360, which corresponds to cellStyleXfs object 460, the second <xf> record 367 (shown with value [1]) shows borderId 363 (corresponding to borderId 463) with value "0" as shown by the dashed lines. The attribute applyBorder 369 (corresponding to applyBorder 469) has the value "0" indicating that no border is applied. The value held by attribute borderId 463 is an index to a record in border object table 430, which indicates characteristics of the specified border for the cell.

Further, cellXfs object 440 holds cell specific formatting information, including values for cell specific format attributes. As shown in FIG. 4, cellXfs object 440 holds a value for xfld 447, which indicates the (zero-based) record number in cellStyleXfs object 460 that holds the cell master format as indicated by the heavy solid line from xfld 447 to xfld 467. In addition, cellXfs object 440 also holds values for attributes borderId 443 and applyBorder 449, which override the values of attributes 463 and 469 in cellStyleXfs 460 as shown by the dotted line. The value held by attribute borderId 443 "2" is an index to a record in border object table 430, which indicates characteristics of the specified border. Therefore, as indicated by cellXfs definition 340, the border corresponding to borderId=2 is applied to cell 312.

In conventional methods for processing spreadsheet objects, the various references to objects described are traversed multiple times during printing causing inefficiencies. Moreover, for each cell being printed attribute values in a multiplicity of tables are looked up and resolved in order to determine the final print attributes which are used to render the cell. Because the lookups occur continually as each cell in the spreadsheet is processed, multiple objects and tables are stored in memory during printing leading to increased memory usage. For example, for SML and various other OOXML descriptions, all data is typically loaded into memory before pagination determinations are made and rendering can start. During conventional processing, when a cell is processed for rendering, cell attribute values specified in the cell master format cellStyleXfs object 460 are looked up. Next, the attribute values in cellXfs object 440 are also looked up to see if these values override any values previously set by cellStyleXfs object 460. The process above is repeated for each cell and each time the cell is processed by downstream routines prior to final rendering thereby contributing to memory and processing inefficiencies.

Figure 5:
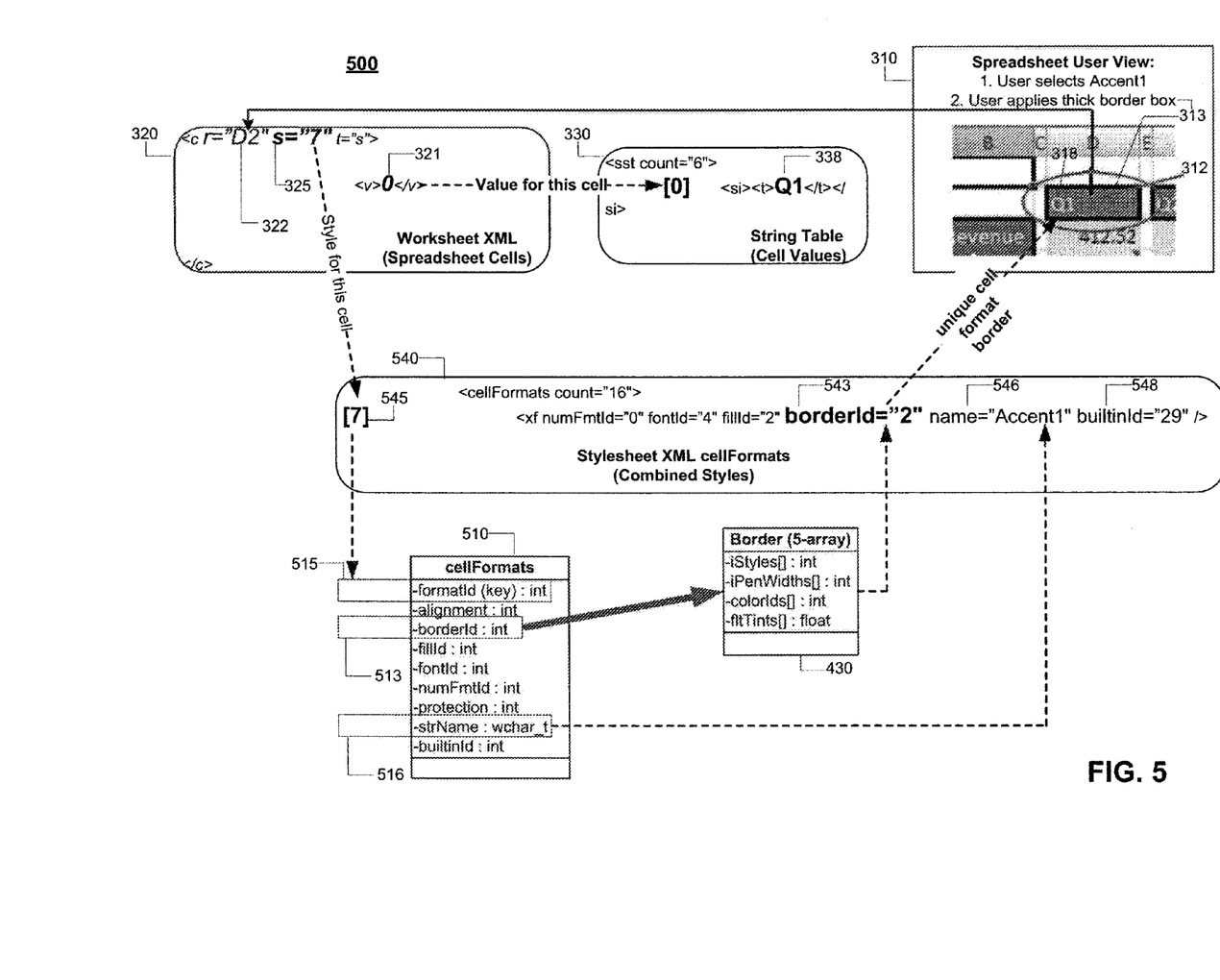
FIG. 5 shows an exemplary object mapping for an OOXML spreadsheet cell resulting from a method of processing spreadsheet style data described using OOXML in a manner consistent with disclosed embodiments.

FIG. 5 shows an exemplary object mapping 500 for an OOXML spreadsheet cell resulting from a method of processing style data for spreadsheets described using OOXML in a manner consistent with disclosed embodiments. Exemplary object mapping 500 may be created during language and object processing step 220 for OOXML spreadsheet document 215. For example, Exemplary object mapping 500 may be created by a parser when processing style objects in a spreadsheet described using OOXML or SML. In some embodiments, exemplary object mapping 500 may be used during raster image processing step 230 to render spreadsheet objects that use styles.

In some embodiments, when OOXML data is read in for document 215, such as a spreadsheet, cell format information in master cell information CellStyleXfs object 460 may be combined with named cell style information in named cell styles CellStyles object 450 and with cell specific information in cell specific style cellXfs object 440 so that the combined cellFormats object 510 directly indicates attribute values and other formatting information for the cell style used. Further, in some embodiments, the Boolean "applyAttribute" attributes (such as applyBorder, applyFill etc), which indicate whether a style attribute should be applied (or not) may be eliminated and the final applied attribute value may be directly specified in the appropriate record in cellFormats object 510.

As shown in FIG. 5, cell 312 in spreadsheet 310 is identified by its location "D2" in cell reference 322 with spreadsheet cell data 318 given by the string "Q1". Cell 312 uses named style 325 with attribute value s="7", which is referenced in Worksheets XML definition 320. Further, spreadsheet cell 312 has a thick border box 313, which has been applied by the user. Cell value index 321 is an index into zero-based index shared string table 330 and indicates the location of the contents of cell 312. Cell value index 321 has the value "0" indicating that it is the first entry in the shared string table 330, which maps to cell data 338 with value "Q1".

As shown in FIG. 5, the attribute value of named style 325 s="7" referenced in Worksheet XML 320 indicates that the eighth (or zero-based $7^{th}$) <xf> definition 545 of cellFormats 540 holds the combined formatting information for cell 312 as shown by the dashed line from named style 325 to the eighth <xf> definition in cellFormats 540. In some embodiments, the combined format record 545 combines and stores all the formatting information pertaining to a cell's formatting. In some embodiments, cellFormats 540 does not include references to cellStyles or to cellStylesXfs. In some embodiments, an OOXML parser may parse the information in an OOXML specification of a spreadsheet, to obtain style information pertaining to cell 312 from cellStyles object 450, cellStylesXfs object 460, and cellXfs object 440. The information from the above objects may combined by: (i) storing the named style information; (ii) eliminating duplicate or redundant information; (iii) obtaining final values for cell style attributes by overriding master style information for a cell with specified cell specific formatting information; and (iv) eliminating the applyAttribute flags (where "Attribute" may be one of Border, Fill, Font etc.). A new "combined" record pertaining to the format of cell 312 may then be created in a cellFormat object 510, which can store the information obtained after applying steps (i) through (iv) above. In some embodiments, a record for a cell may be created at the appropriate location in cellFormat object 510 based on the value of named style attribute 325. For example, if the attribute value of named style 325 s="7" then the combined cellFormats record may be created as the eighth record.

In some embodiments, the XML cellFormats definition 540 can specify the combined formatting elements for cell 312 for application. For example, the attribute value for borderId 543 is specified as "2" and the attribute value for the Style name 546 is specified as "Accent 1". As shown in FIG. 5, cellFormats object 510 corresponds to XML cellFormats definition 540. Accordingly, in cellFormats object 510, formatID 515 identifies the zero-based record number corresponding to named style 325. For cell 312, s="7" in Worksheet XML 320, therefore formatID 515 has the value 7. Similarly, strName 516 identifies the named style as "Accent1" and holds a value of "2" for borderId 513. The value "2" held by attribute borderId 513 is an index to a record in border object table 430 as shown by the heavy solid line. The specified record in border object table 430 indicates characteristics of the specified border. Therefore, as indicated by cellFormats definition 340, the border corresponding to borderId=2 is applied to cell 312 as shown by the dashed lines. In some embodiments, combined cellFormats object 510 permits quicker cell pagination and rendering with less pointers to follow and using less memory resources.

Other implementations will be apparent to those skilled in the art from consideration of the specification and practice of disclosed embodiments. It is intended that the specification and examples be considered as exemplary only, with its true scope and spirit being indicated by the following claims.

What is claimed is:

1. A processor-implemented method for storing formatting information for at least one cell in a spreadsheet document described in a markup language, wherein the spreadsheet document includes a plurality of style objects, the method comprising:
   parsing the spreadsheet document to generate at least one display list of a cell format object for the at least one cell by:
   obtaining cell formatting information for the at least one cell from a master style object that stores master formatting information for the at least one cell;
   obtaining named style information for the at least one cell from a style name object that stores named styles for the at least one cell and references the cell master style object;
   obtaining cell specific formatting information for the at least one cell from a cell-specific style object that includes cell specific formatting information for the at least one cell and references the master style object, wherein the cell specific formatting information overrides master formatting information;
   generating combined cell formatting information for the at least one cell in the cell format object, wherein the combined cell formatting information in the cell format object comprises named styles for the at least one cell, cell-specific formatting information that has overridden formatting information in the master style object, and master formatting information that has not been overridden by the cell-specific formatting information, wherein the formatting information originally described in the master style object but overridden by the cell-specific information is not included in the combined cell formatting information for the cell format object; and
   storing the combined cell formatting information as the at least one display list of the cell format object; and
   rasterizing the at least one cell in a frame buffer using the stored at least one display list of the cell format object.

2. The processor-implemented method of claim 1, wherein the spreadsheet document is described in OOXML.

3. The processor-implemented method of claim 1, wherein the spreadsheet document is described in SML.

4. The processor-implemented method of claim 1, wherein the method is performed by a parser.

5. The processor-implemented method of claim 1, wherein the cell format object is used to render the cell.

6. The processor-implemented method of claim 1, further comprising:
   deleting the master style object, style-name object, and the cell-specific style object for the at least one cell from a memory coupled to the processor after storing combined cell formatting information for the at least one cell.

7. The processor-implemented method of claim 1, wherein the style information includes at least one of border information, font information, or fill information.

8. The processor-implemented method of claim 1, wherein the method is performed on:
   a computer;
   a printer; or
   a printer coupled to a computer.

9. A non-transitory computer-readable medium that stores instructions that when executed by a processor perform a method for storing formatting information for at least one cell in a spreadsheet document described in a markup language, wherein the spreadsheet document includes a plurality of style objects, the method comprising:
   parsing the spreadsheet document to generate at least one display list of a cell format object for the at least one cell by:
   obtaining cell formatting information for the at least one cell from a master style object that stores master formatting information for the at least one cell;
   obtaining named style information for the at least one cell from a style name object that stores named styles for the at least one cell and references the cell master style object;
   obtaining cell specific formatting information for the at least one cell from a cell-specific style object that includes cell specific formatting information for the at least one cell and references the master style object, wherein the cell specific formatting information overrides master formatting information;
   generating combined cell formatting information for the at least one cell in the cell format object, wherein the combined cell formatting information in the cell format object comprises named styles for the at least one cell, cell-specific formatting information that has overridden formatting information in the master style object, and master formatting information that has not been overridden by the cell-specific formatting information, wherein the formatting information originally described in the master style object but overridden by the cell-specific information is not included in the combined cell formatting information for the cell format object; and storing the combined cell formatting information as the at least one display list of the cell format object; and rasterizing the at least one cell in a frame buffer using the stored at least one display list of the cell format object.

10. The computer-readable medium of claim 9, wherein the spreadsheet document is described in OOXML.

11. The computer-readable medium of claim 9, wherein the spreadsheet document is described in SML.

12. The computer-readable medium of claim 9, wherein the method is performed by a parser.

13. The computer-readable medium of claim 9, wherein the cell format object is used to render the cell.

14. The computer-readable medium of claim 9, further comprising:

deleting the master style object, style-name object, and the cell-specific style object for the at least one cell from a memory coupled to the processor after storing combined cell formatting information for the at least one cell.

15. The computer-readable medium of claim 9, wherein the style information includes at least one of border information, font information, or fill information.

16. The computer-readable medium of claim 9, wherein the method is performed on:

a computer;

a printer; or a printer coupled to a computer.

17. A non-transitory computer-readable memory that stores instructions that when executed by a processor perform a method for storing formatting information for at least one cell in a spreadsheet document described in a markup language, wherein the spreadsheet document includes a plurality of style objects, the method comprising:

parsing the spreadsheet document to generate at least one display list of a cell format object for the at least one cell by:

obtaining cell formatting information for the at least one cell from a master style object that stores master formatting information for the at least one cell;

obtaining named style information for the at least one cell from a style name object that stores named styles for the at least one cell and references the cell master style object;

obtaining cell specific formatting information for the at least one cell from a cell-specific style object that includes cell specific formatting information for the at least one cell and references the master style object, wherein the cell specific formatting information overrides master formatting information;

generating combined cell formatting information for the at least one cell in the cell format object, wherein the combined cell formatting information in the cell format object comprises named styles for the at least one cell, cell-specific formatting information that has overridden formatting information in the master style object, and master formatting information that has not been overridden by the cell-specific formatting information, wherein the formatting information originally described in the master style object but overridden by the cell-specific information is not included in the combined cell formatting information for the cell format object; and storing the combined cell formatting information as the at least one display list of the cell format object; and rasterizing the at least one cell in a frame buffer using the stored at least one display list of the cell format object.

18. The computer-readable memory of claim 17, wherein the spreadsheet document is described in OOXML.

19. The computer-readable memory of claim 17, wherein the spreadsheet document is described in SML.

20. The computer-readable memory of claim 17, wherein the method is performed by a parser.

* * * * *